UNITED STATES PATENT OFFICE.

CARLETON ELLIS, OF MONTCLAIR, NEW JERSEY.

AMMONIA-OXIDATION PROCESS.

1,237,884.     Specification of Letters Patent.     Patented Aug. 21, 1917.

No Drawing.     Application filed January 2, 1917. Serial No. 140,286.

*To all whom it may concern:*

Be it known that I, CARLETON ELLIS, a citizen of the United States, and a resident of Montclair, in the county of Essex and State of New Jersey, have invented certain new and useful Improvements in Ammonia-Oxidation Processes of which the following is a specification.

This invention relates to a process of oxidizing ammonia to form nitrous acid, nitric acid, ammonium nitrate, nitrite and the like and to catalyzers adapted therefor and relates particularly to the treatment of a mixture of ammonia with air or oxygen, comprising exposure to a heated mass of catalytic material comprising a salt of silver, under conditions adapted for efficient oxidation.

In the oxidation of ammonia especially with a powerful oxidizing catalyst such as platinum a good deal of difficulty is experienced in regulating the oxidation so as to not burn a portion of the ammonia to nitrogen and in the present invention it is one object to provide a group of catalytic agents capable of selectively oxidizing ammonia to nitrogen oxids or ammonium nitrate as the case may be.

A series of compounds effective for the purposes of the present invention are salts or compounds of silver. Among such compounds may be mentioned silver vanadate, silver phosphate and silver molybdate which may be termed simple compounds or salts of silver and also various double compounds of the nature, for example, of silver manganese chromate.

Such granular porous masses may be readily charged into a suitable catalytic chamber and afford a very porous or penetrable bed through which a current of ammonia laden air may be passed freely so that no undue pressures are required to drive the gases through the apparatus, although if desired the whole system may be under super-atmospheric pressure.

The temperature of the reaction mass is usually around a low red heat and this varies somewhat with the character of the catalytic agent and the manner in which it is prepared. The rate of flow of the gases also is regulated according to circumstances. For example, if the catalytic material is supported on asbestos fiber after a time the latter will tend to pack and form a felt through which the gases pass with difficulty requiring increasing pressures and leading to disturbances caused by lack of proper adjustment which are undesirable. While in some cases it may be feasible to use such asbestos-coated material in the present invention it is particularly the object to use the material in the form of granules, which granules preferably are porous and these fragments or granules are packed in a catalytic chamber which preferably is placed in a vertical position in order to prevent settlement of the catalytic material at the top as not infrequently occurs when the catalytic material is placed in tubular horizontal catalytic chambers. By disposing such granular catalytic bodies in a vertical tube this difficulty is obviated.

The mixture of ammonia and air may be preheated or not according to the proportions of the mixture and the size of the apparatus. Large masses of catalyzer are liable to overheat if the air content is low in which case cooling is necessary or desirable.

The regulations of the temperature in large masses of catalyzer is attained by introducing a mixture of air with ammonia in excess and after the reaction has started at one end of the catalyzer chamber additional air is added at one or more points in the catalyzer mass through distributing tubes until a sufficient amount of air is introduced to completely burn the ammonia to the products desired. Thus the final air content may be represented by the equivalent of adding five or six per cent. of ammonia to the air mixture before entering the chamber. Or a much larger proportion of ammonia may be used so that the total air employed is precisely the equivalent of that required for the complete oxidation of ammonia. In other cases ammonia may be used in excess of the total air employed in order to better control the temperature and when pure nitrogen is required to more completely burn out the oxygen. The excess of ammonia or ammonium salt is duly removed or recovered and the nitrogen practically free from oxygen may be used in the manufacture of synthetic ammonia.

Nitrous oxid ($N_2O$) is formed by heating ammonium nitrate. Hence if ammonium nitrate is formed in the catalytic process in the earlier stages of the catalytic conversion when an excess of ammonia is present with nitric and nitrous oxids there always is the possibility of decomposition caused by the high temperature to which the material is subjected, resulting in the formation of nitrous oxid which of course cannot be absorbed in alkaline solutions. In case such reaction goes on to an excessive degree under imposed conditions, the nitrous oxid may be separately collected.

The oxidation of the ammonia also may form nitric oxid (NO) which in the presence of air eventually forms nitrogen tetroxid or peroxid ($N_2O_4$). Nitrogen peroxid reacts with nitric oxid to form nitrogen trioxid ($N_2O_3$) which may be absorbed by alkali to yield nitrites.

Nitrogen peroxid with water forms nitric acid and liberates nitric oxid which in the presence of air is oxidized to nitrogen peroxid and ultimately the entire content of nitric oxid becomes converted into nitric acid in the presence of air and moisture.

What I claim is:—

1. The process of making oxids of nitrogen which comprises passing ammonia and an oxygen-containing gas into contact with an oxidizing catalyst comprising a salt of silver.

2. The process of forming oxids of nitrogen which comprises passing ammonia and air into contact with an oxidizing catalyst comprising silver molybdate.

3. The process of making oxids of nitrogen which comprises passing ammonia and an oxygen-containing gas into contact with a compound of silver with an oxygen compound of another element.

CARLETON ELLIS.